(12) United States Patent
Chen (10) Patent No.: US 11,311,129 B1
(45) Date of Patent: Apr. 26, 2022

(54) SMART BOTTLE HOLDER AND DAILY WATER CONSUMPTION MONITORING METHOD AND SYSTEM THEREOF

(71) Applicant: XIAMEN SIENLUO TRADING CO., LTD., Xiamen (CN)

(72) Inventor: Honghui Chen, Xiamen (CN)

(73) Assignee: XIAMEN SIENLUO TRADING CO., LTD., Xiamen (CN)

( * ) Notice: Subject to any disclaimer, the term of this patent is extended or adjusted under 35 U.S.C. 154(b) by 0 days.

(21) Appl. No.: 17/348,788

(22) Filed: Jun. 16, 2021

Related U.S. Application Data (63) Continuation of application No. 17/326,355, filed on May 21, 2021.

(30) Foreign Application Priority Data

Apr. 29, 2021 (CN) .......................... 202110471841.0

(51) Int. Cl.
| | |
|---|---|
| *G01F 23/20* | (2006.01) |
| *A47G 23/14* | (2006.01) |
| *A47G 19/22* | (2006.01) |
| *G01F 17/00* | (2006.01) |
| *G06F 9/54* | (2006.01) |

(Continued)

(52) U.S. Cl.
CPC ......... *A47G 23/14* (2013.01); *A47G 19/2227* (2013.01); *G01F 17/00* (2013.01); *G01F 23/20* (2013.01); *G06F 9/542* (2013.01); *H04L 67/12* (2013.01); *A47G 2200/186* (2013.01); *A47G 2200/226* (2013.01); *G01G 9/00* (2013.01)

(58) Field of Classification Search
CPC ................ A47G 23/14; A47G 19/2227; A47G 2200/186; A47G 2200/226; G01F 17/00; G01F 23/20; G06F 9/542; H04L 67/12; G01G 9/00
See application file for complete search history.

(56) References Cited

U.S. PATENT DOCUMENTS 10,863,852 B1 * 12/2020 Lyons .................. B67D 1/1243
2014/0372045 A1 * 12/2014 Keski-Pukkila ....... A61B 5/742
702/19

(Continued)

FOREIGN PATENT DOCUMENTS

| CN | 111977743 A | * | 11/2020 | |
| WO | WO-2018122173 A1 | * | 7/2018 | ................ A61J 9/06 |

*Primary Examiner* — Herbert K Roberts
*Assistant Examiner* — Fatemeh Esfandiari Nia (57) ABSTRACT

The present disclosure relates to a smart bottle holder and a daily water consumption monitoring method and system thereof. The smart bottle holder includes a bottle holder main body for accommodating a bottle, and a control unit provided in a bottom part of the bottle holder main body. The control unit includes a weighing module, for obtaining a total weight of the bottle and water therein; a controller; a communication module, for sending water consumption data to an external terminal; and a power module, for supplying power to the weighing module, controller, and communication module. Compared with the prior art, the present disclosure has stronger structural mobility and wider range of applications. Also, the present disclosure is more power-saving and environmentally friendly and can provide more accurate water consumption statistics.

9 Claims, 8 Drawing Sheets

(51) Int. Cl.
*H04L 67/12* (2022.01)
*G01G 9/00* (2006.01)

(56) References Cited

U.S. PATENT DOCUMENTS

2016/0146659 A1* 5/2016 Saltzgiver .............. A47G 23/16
                                                        206/459.1
2017/0176238 A1* 6/2017 Dubey ................... G01G 17/06
2018/0348036 A1* 12/2018 Hsiao ..................... A47G 23/16

* cited by examiner

SMART BOTTLE HOLDER AND DAILY WATER CONSUMPTION MONITORING METHOD AND SYSTEM THEREOF

CROSS REFERENCE TO THE RELATED APPLICATIONS

This application is a continuation of U.S. patent application Ser. No. 17/326,355, filed May 21, 2021, which is incorporated by reference herein in its entirety.

TECHNICAL FIELD

The present disclosure relates to the technical field of bottle accessories, in particular to a smart bottle holder and a daily water consumption monitoring method and system thereof.

BACKGROUND

Living in a fast-paced modern society, many people, especially young office workers, regularly forget to drink the water due to their busy work. Inadequate water consumption can lead to health problems. Currently, a wide variety of smart water bottle or thermal bottle products have been launched on the market, and these products are usually provided with a built-in function module for statistics of water consumption and reminding the user to drink water. However, the addition of the functional module on the water bottle or the thermal bottle often renders the structure of the bottle more complex and increases the volume of the bottle, which is very inconvenient to use. Moreover, there is a high possibility for water bottles or thermal bottles to come into contact with water and to suffer fall-off or hitting during use. Therefore, it is necessary to develop a product which not only can remind users to drink water, but also has a simpler structure, lighter weight, and better waterproof performance, and can withstand frequent fall-off or hitting, etc. Furthermore, existing water bottles with the function of monitoring the user's water consumption generally measures the amount of water in the bottle and calculates the water consumption through the changes of the amount of water. It has a disadvantage that it cannot recognize the user's actions of pouring water, adding water, drinking water, etc., which affects the accuracy of water consumption statistics.

SUMMARY OF DISCLOSURE

The present disclosure aims to overcome the drawbacks of the prior art and provide a water consumption monitoring system.

In order to achieve the above objectives, the present disclosure provides the following technical solutions.

A smart bottle holder includes:
a bottle holder main body for accommodating a bottle and a control unit provided in a bottom part of the bottle holder main body, wherein the control unit includes:
a weighing module, for obtaining a total weight of the bottle and water therein;
a controller, for determining whether a user performs a water drinking action according to movement data, wherein if the user performs the water drinking action, after the bottle is put down and stands still, the controller controls the weighing module to weigh the bottle and water to obtain a current weight, and calculates a difference between a previous weight and the current weight as a water consumption, otherwise, the controller controls the weighing module to weigh the bottle and water to obtain and save the current weight after the bottle is put down and stands still; and a power module, for supplying power to the weighing module, controller, and communication module.

The control unit further includes a wake-up module for detecting a movement signal of the bottle holder main body, and the wake-up module is further used for issuing a wake-up signal when the movement signal is detected. The controller is further used for acquiring the movement data of the bottle holder main body according to the wake-up signal, and determining whether the bottle holder main body is put down and stands still, if yes, a timer is started. The controller is further used for determining whether a standstill time of the bottle holder main body is greater than or equal to a threshold, if yes, entering a sleep mode.

Further, the wake-up module is a multi-axis accelerometer, and the multi-axis accelerometer is configured to obtain the movement signal of the bottle holder main body.

The controller is further configured to obtain outputs of the multi-axis accelerometer at a frequency according to the wake-up signal, create a curve of the outputs within a period of time, analyze parameters of the curve, and recognize the drinking action, wherein the parameters of the curve include a shape of the curve and a slope of a key point of the curve.

Further, the bottle holder main body includes a first cavity and a second cavity that are separated from each other, a bottom of the bottle is detachably connected to the first cavity, and the control unit is arranged in the second cavity.

Further, the weighing module includes a plurality of weighing sensors, and the plurality of weighing sensors are evenly arranged around the bottom of the bottle.

According to another aspect, the present disclosure provides a daily water consumption monitoring method, including:
detecting a movement signal of a bottle holder main body;
issuing a wake-up signal when the movement signal is detected;
acquiring movement data of the bottle holder main body, determining whether the bottle holder main body is put down and stands still, if yes, starting a timer and controlling a weighing module to weigh a bottle and water therein to obtain and record a current weight as $w_t$, otherwise, continuing to acquire the movement data of the bottle holder main body;
determining whether a user performs a water drinking action according to the movement data, if yes, calculating a difference between a previous weight $w_{t-1}$ and a current weight $w_t$ as a water consumption and replacing a value of $w_{t-1}$ with a value of $w_t$, otherwise, replacing a value of $w_{t-1}$ with a value of $w_t$ directly;
determining whether a standstill time of the bottle holder main body is greater than or equal to a threshold, if yes, entering a sleep mode, otherwise, returning to the step of weighing the bottle and water therein to obtain and record the current weight as $w_t$.

According to another aspect, the present disclosure provides a daily water consumption monitoring system, including:
a smart bottle holder and a user terminal;
wherein, the smart bottle holder includes: a bottle holder main body for accommodating a bottle, and a control unit provided in a bottom part of the bottle holder main body, wherein the control unit includes:
a weighing module, for obtaining a total weight of the bottle and water therein;
a controller, for determining whether a user performs a water drinking action according to movement data, wherein if the user performs the water drinking action, after the bottle is put down and stands still, the controller controls the weighing module to weigh the bottle and water to obtain a current weight, and calculate a difference between a previous weight and the current weight as a water consumption, otherwise, the controller controls the weighing module to weigh the bottle and water to obtain and save the current weight after the bottle is put down and stands still;

a communication module, for sending water consumption data to an external terminal;

a power module, for supplying power to the weighing module, controller, and communication module; and the user terminal is used to update a daily water consumption, and is further used to remind the user to drink water in time when the water consumption is insufficient.

The control unit further includes a wake-up module for detecting a movement signal of the bottle holder main body, and the wake-up module is further used for issuing a wake-up signal when the movement signal is detected. The controller is further used for acquiring the movement data of the bottle holder main body according to the wake-up signal, and determining whether the bottle holder main body is put down and stands still, if yes, a timer is started. The controller is further used for determining whether a standstill time of the bottle holder main body is greater than or equal to a threshold, if yes, entering a sleep mode.

The advantages of the present disclosure are stated below.

The present disclosure provides a smart bottle holder and a daily water consumption monitoring method and system thereof. The smart bottle holder is detachably connected around the bottom of a bottle, and can be applied to a wide variety of water bottles, thermal bottles, and other products. The smart bottle holder can achieve the function of monitoring water consumption and reminding the user to drink water in time without the need for reconstructing the structure of the bottle body. Hence, the smart bottle holder of the present disclosure has stronger structural mobility and wider range of applications. When there is no movement signal detected by the control unit of the bottle holder, the electrical modules are in a sleep mode. After the movement signal is detected, the electrical modules are wakened up to obtain the weight of the bottle and water therein, so it is more power-saving and environmentally friendly. Further, the control unit acquires the movement data of the bottle holder and determines whether the user performs a water drinking action, and if yes, the difference between the previous weight and the current weight is calculated as the water consumption. The smart bottle holder of the present disclosure can recognize whether the user's operation involves a drinking action, which eliminates the interference of the user's actions of adding water, pouring water, shaking, etc., thereby improving the accuracy of water consumption statistics.

The realization of the objectives, functional characteristics and advantages of the present disclosure will be further described in the embodiments regarding the drawings.

DETAILED DESCRIPTION

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, the terms "first", "second" are used only for descriptive purposes and cannot be understood as indicating or implying relative importance or implying the number of indicated technical features. Thus, a characteristic that is referred to by "first" and "second" may include, expressly or implicitly, one or more of the characteristics. Also, it should be noted that the terms of "up", "down", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure.

In the description of the present disclosure, it should be noted that, unless otherwise clearly defined, the terms "provide/arrange", "connect", etc. should be understood in a broad sense. For example, "connect" may be interpreted as a fixed connection, a detachable connection, or an integrated connection, it may also be interpreted as a mechanical connection or an electrical connection, or a direct connection or an indirect connection through an intermediate medium. Optionally, it may refer to the communication of two components. For those of ordinary skill in the art, the meaning of the above-mentioned terms in the present disclosure should be understood under specific circumstances.

The content of the present disclosure will be described in detail below in terms of the embodiments.

Embodiment 1

Referring to FIGS. 1-3 and 9, according to one aspect, the present disclosure provides a smart water bottle holder 100 including a bottle holder main body 10 for accommodating a bottle and a control unit 20 provided in a bottom part of the bottle holder main body 10. The control unit 20 includes a weighing module 21, for obtaining a total weight of the bottle and water therein; a controller 22, for determining whether a user performs a water drinking action according to movement data, wherein if the user performs the water drinking action, after the bottle is put down and stands still, the controller 22 controls the weighing module 21 to weigh the bottle and water to obtain a current weight, and calculate a difference between a previous weight and the current weight as a water consumption, otherwise, the controller 22 controls the weighing module 21 to weigh the bottle and water to obtain and save the current weight after the bottle is put down and stands still; and a power module 24, for supplying power to the weighing module 21, controller 22, and communication module 23. As an implementation of the present disclosure, the controller 22 may be a control chip such as a micro control unit (MCU) etc., which can send the water consumption data to various external smart terminals, such as smart phones, IPADs and other devices. The water consumption information may be displayed on a display provided on the bottle holder main body 10. Optionally, the control unit 20 may further includes a communication module 23, for sending water consumption data to an external terminal. The communication module 23 may be a functional module capable of wireless and/or wired connection for signal transmissions, such as a BLUETOOTH module or a WIFI module. Further, the controller 22 may also detect the capacity and charging status of the power module 24, and convert the battery capacity data into percentage type. The battery capacity percentage, water consumption, and charging status are sent to the corresponding APP installed in the smart terminal through the communication module 23.

As an implementation of the present disclosure, the controller 22 is further used to determine whether the standstill time of the bottle is greater than or equal to the threshold, if yes, entering a sleep mode. The control unit 22 further includes a wake-up module 25 for detecting a movement signal of the bottle holder main body 10, and the wake-up module 25 is further used for issuing a wake-up signal when the movement signal is detected. The controller 22 is further used for acquiring the movement data of the bottle holder main body 10 according to the wake-up signal, and determining whether the bottle holder main body 10 is put down and stands still, if yes, a timer is started. The controller 22 is further used for determining whether a standstill time of the bottle holder main body 10 is greater than or equal to a threshold, if yes, entering a sleep mode. Furthermore, the wake-up module 25 is a multi-axis accelerometer, and the multi-axis accelerometer is configured to obtain the movement signal of the bottle holder main body 10. For example, the wake-up module 25 may be a three-axis accelerometer used to obtain the three-axis output of the bottle holder main body 10. The three-axis accelerometer can be set to issue the wake-up signal when the output of one axis, two axes, or three axes of the three-axis accelerometer is/are greater than or equal to a predetermined threshold. The issuance of the wake-up signal may be achieved by setting the wake-up function of the accelerometer. When the output of any one, two, or three axes of the accelerometer is greater than or equal to a preset acceleration threshold, a pin of the accelerometer is paused to output a pause signal to wake up the system.

As an implementation of the present disclosure, the controller 22 is further configured to obtain outputs of the multi-axis accelerometer at a fixed frequency according to the wake-up signal, create a curve of the outputs within a period of time, analyze parameters of the curve, and recognize the drinking action, wherein the parameters of the curve include a shape of the curve and a slope of a key point of the curve, etc. For example, the controller 22 may obtain the outputs of the multi-axis accelerometer at a frequency of 10-60 times/sec, and create a curve within a time period of 1 minute, then recognize whether the user performs the water drinking action by analyzing the shape of the curve and the slope of the key points of the curve. Specifically, when the user drinks water, the action is relatively gentle and roughly at a uniform speed, so the multi-axis acceleration of the bottle is kept at a low level or even close to 0, and the curve of the outputs of the multi-axis accelerometer is relatively stable. Whereas, when the user is pouring water or shaking the bottle, the action is generally strong and quick, and the change of accelerations is more obvious than the action of drinking water. Therefore, different actions can be recognized according to the shape of the acceleration curve or the slope at key points of the curve, and the action of drinking water can be identified.

Figure 11:
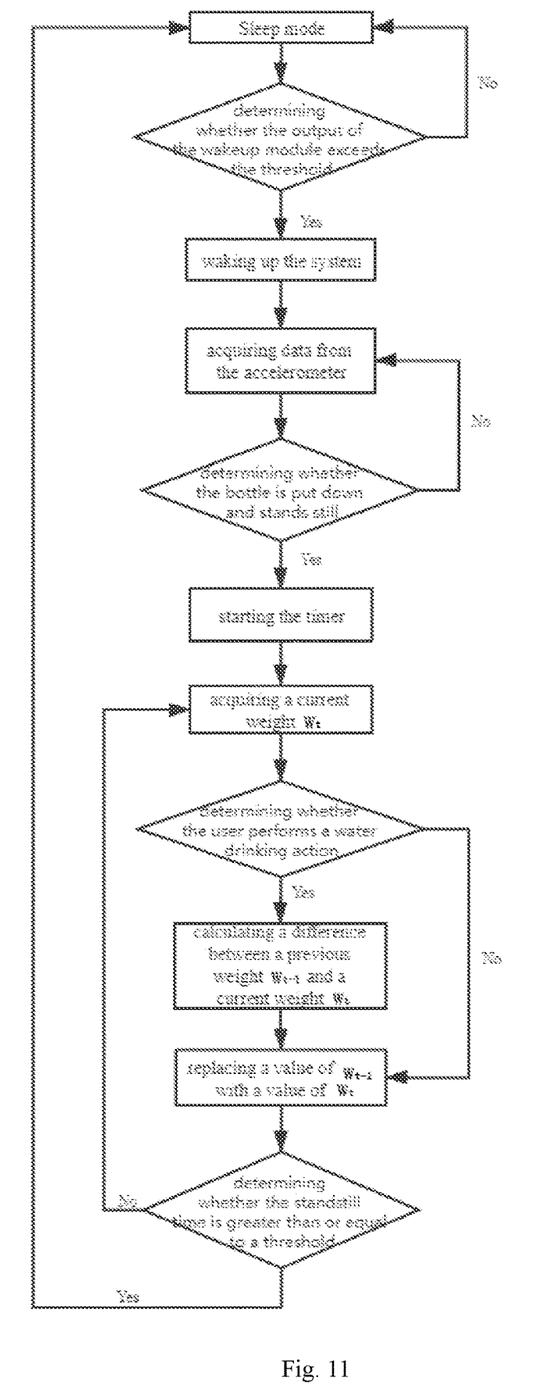
FIG. 11 is a logic diagram of one embodiment of the present disclosure.

As an implementation of the present disclosure, as shown in the logic block diagram of FIG. 11, the multi-axis accelerometer may be set to wake up the system when the output of any one of the multi-axis is greater than the wake-up threshold when the bottle is picked up. Then, the controller 22 acquires the data of the multi-axis accelerometer (i.e. the movement data) and determines whether the bottle is put down and stands still (the system can determine whether the bottle is put down and stands still by judging whether the output of the accelerometer is 0). If yes, a timer is started and the weighing module 21 is controlled to weigh the bottle and water therein to obtain and record a current weight as $w_t$. Otherwise, the acquisition is continued to obtain the movement data of the bottle holder main body. The controller 22 further creates a curve based on the outputs of the multi-axis accelerometer and determines whether the user performs the water drinking action. If the user performs the drinking action, a difference between a previous weight $w_{t-1}$ and a current weight $w_t$ is calculated as the water consumption, then the value of $w_{t-1}$ is replaced with the value of $w_t$, otherwise, the value of $w_{t-1}$ is replaced with the value of $w_t$ directly. Then, the controller 22 determines whether the standstill time of the bottle is greater than or equal to the threshold, if yes, entering the sleep mode, otherwise, returning to the step of weighing the bottle and water therein to obtain and record a current weight as $w_t$. Further, the controller 22 creates a curve based on the outputs of the multi-axis accelerometer and determines whether the user performs the water drinking action, and then performs operations such as entering sleep mode, etc.

As an implementation of the present disclosure, preferably, the smart bottle holder can be applied to water bottles with a capacity of 1000 cc or 2000 cc etc., or the user can set a daily target water consumption according to his/her own needs. First, the user needs to fill the bottle with the water of the desired amount, then firmly connect the bottom of the bottle to the smart bottle holder and put it down to standstill. Afterward, the system of the smart bottle holder is initialized and started to obtain the weight of the bottle and water therein as the basis for calculating the weight difference when the weight is obtained again the next time. The water consumption data can be cleared and updated every day. Further, a target water consumption for a fixed time period per day can be set. If the target water consumption is not reached in the corresponding time period, a reminder may be sent through the communication module 23 to the external smart terminal to remind the user to drink water.

As an implementation of the present disclosure, the bottle holder main body 10 includes a first cavity 11 and a second cavity 12 that are separated from each other. The bottom of the bottle is detachably connected to the first cavity 11, and the control unit 20 is arranged in the second cavity 12. Optionally, as shown in the figures, the bottle holder main body 10 may further include a detachable lower cover 30 for sealing the second cavity 12. The bottle holder main body 10 may also not include the lower cover 30, namely, the second cavity 12 is directly sealed during molding. The first cavity 11 is detachably connected around the bottom of the bottle, so the smart bottle holder of the present disclosure can be applied to various water bottles, thermal bottles and other products to realize the function of water consumption statistics and reminding users to drink water in time without the need to reconstruct the structure of the bottle body. Hence, the smart bottle holder of the present disclosure has stronger structural mobility and wider range of applications. In addition, since the space for accommodating the bottle is separated from the space for accommodating the control unit, the waterproof performance and the safety of use are improved, which prolongs the service life.

As an implementation of the present disclosure, the weighing module 21 includes several weighing sensors 211, and the weighing sensors 211 are evenly arranged around the bottom of the bottle. For example, as shown in the figures, the weighing sensors 211 may be evenly arranged to surround the bottom side of the bottle 100 at the front, rear, left, and right sides of the bottle bottom as shown in the drawing. The even arrangement of the weighing sensors 211 around the bottom side of the bottle can solve the problem of an unbalanced load of the sensors caused by a single point of force when only one sensor is provided, and reduce the overall volume of the weighing module 21. Further, the weighing sensors 211 may be pressure sensors or other sensors that can obtain the weight or water consumption data. The first cavity 11 may be made of a silicon material, and the second cavity 12 may be made of a silicone material or other materials, such as plastic and the like. The first cavity 11 and the second cavity 12 may also be integrally formed without joint lines, which improves the visual effect and waterproof performance. Further, the control unit 20 may also upgrade the device firmware over-the-air, aka OTA. The power module 24 may be charged by magnetic wireless charging, and the lower cover 30 may be configured as the surface to be coupled with the wireless charger. When the lower cover 30 is successfully coupled with the wireless charger, the power supply module 24 would get charged.

Embodiment 2

Referring to FIG. 4-8, according to another aspect, the present disclosure provides a smart bottle holder, including: a bottle holder main body 10 for accommodating a bottle and a control unit 20 provided in a bottom part of the bottle holder main body 10. The control unit 20 includes: a weighing module 21, for obtaining a total weight of the bottle and water therein; a controller 22, for acquiring movement data of the bottle holder main body, and determining whether the bottle is put down and stands still, if yes, the weighing module 21 is controlled to weigh the bottle and water therein to obtain and record a current weight as $w_t$; the controller 22 is further used for determining whether a user performs a water drinking action according to the movement data, wherein if the user performs the water drinking action, the controller 22 calculates a difference between a previous weight $w_{t-1}$ and the current weight $w_t$ as a water consumption, then the value of $w_{t-1}$ is replaced with the value of $w_t$, otherwise, the value of $w_{t-1}$ is replaced with the value of $w_t$ directly; a communication module 23, for sending water consumption data to an external terminal; and a power module 24, for supplying power to the weighing module 21, controller 22, and communication module 23. As an implementation of the present disclosure, the controller 22 may be a control chip such as a micro control unit (MCU) etc., which can send the water consumption data to various external smart terminals, such as smart phones, iPADs and other devices. The communication module 23 may be a functional module capable of wireless and/or wired connection for signal transmissions, such as a BLUETOOTH module or a WIFI module. Further, the controller 22 may also detect the capacity and charging status of the power module 24, and convert the battery capacity data into percentage type. The battery capacity percentage, water consumption, and charging status are sent to the corresponding APP installed in the smart terminal through the communication module 23.

As an implementation of the present disclosure, the controller 22 is further used to determine whether the standstill time of the bottle is greater than or equal to the threshold, if yes, entering a sleep mode. The control unit 22 further includes a wake-up module 25 for detecting the movement signal of the bottle holder main body 10, and the wake-up module 25 is further used for issuing a wake-up signal when the movement signal is detected. The controller 22 is further used for acquiring movement data of the bottle holder main body 10 according to the wake-up signal, and determining whether the bottle holder main body 10 is put down and stands still, if yes, a timer is started. The controller 22 is further used for determining whether a standstill time of the bottle holder main body 10 is greater than or equal to a threshold, if yes, entering a sleep mode. Furthermore, the wake-up module 25 is a multi-axis accelerometer, and the multi-axis accelerometer is configured to obtain the movement signal of the bottle holder main body 10. For example, the wake-up module 25 may be a three-axis accelerometer used to obtain the three-axis output of the bottle holder main body 10. The three-axis accelerometer can be set to issue the wake-up signal when the output of one axis, two axes, or three axes of the three-axis accelerometer is/are greater than or equal to a predetermined threshold. The issuance of the wake-up signal may be achieved by setting the wake-up function of the accelerometer. When the output of any one, two, or three axes of the accelerometer is greater than or equal to a preset acceleration threshold, a pin of the accelerometer is paused to output a pause signal to wake up the system.

Further, as shown in FIGS. 4-8, the bottle holder main body 1 includes a first cavity 11 and a second cavity 12 that are separated from each other, the bottom of the bottle is detachably connected to the first cavity 11. The weighing module 21, the controller 22, communication module 23, power module 24, and wake-up module 25 are arranged and laminated in the second cavity 12. The weighing module 21 is located close to the partition of the first cavity 11 and the second cavity 12. This arrangement can greatly reduce the volume of the electrical modules, the lamination of components can reduce the displacement of the components during movements and improve the fall-off and hitting resistance, and the weighing module 21 being located close to partition of the first cavity 11 and the second cavity 12 can improve the sensitivity of the weighing sensors.

Figure 1:
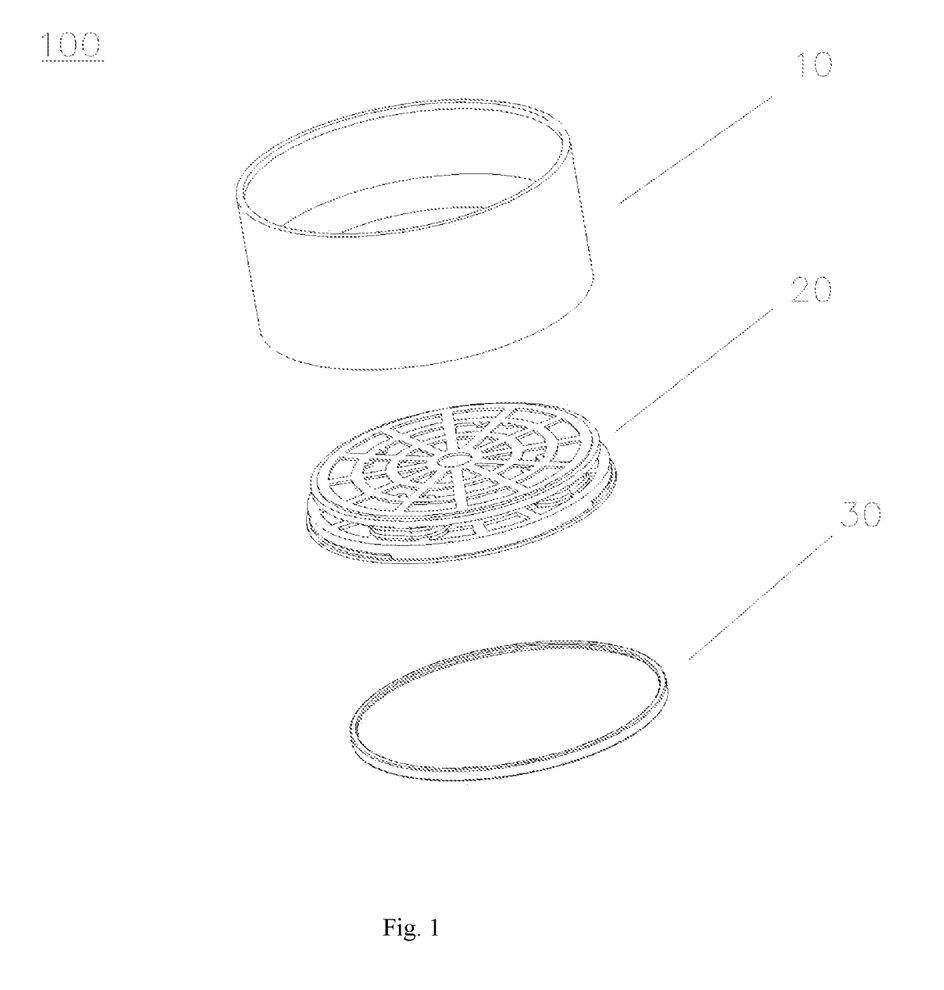
FIG. 1 is an exploded view showing a structure of a smart bottle holder according to one embodiment of the present disclosure.
Figure 2:
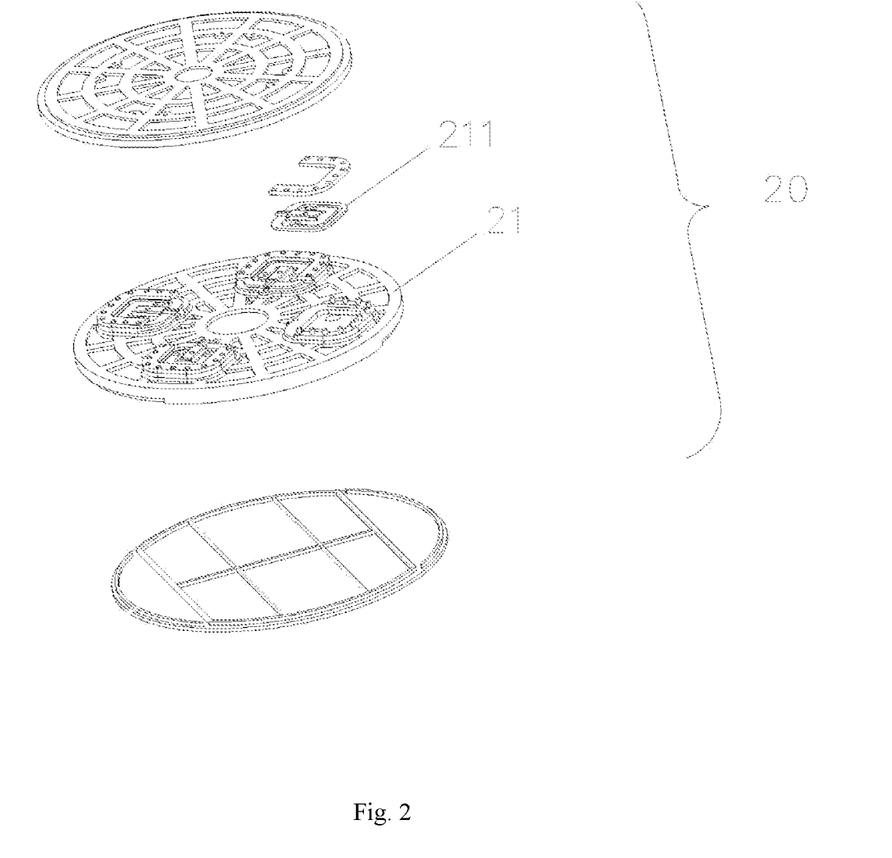
FIG. 2 is an exploded view showing the structure of a control unit according to one embodiment of the present disclosure.
Figure 3:
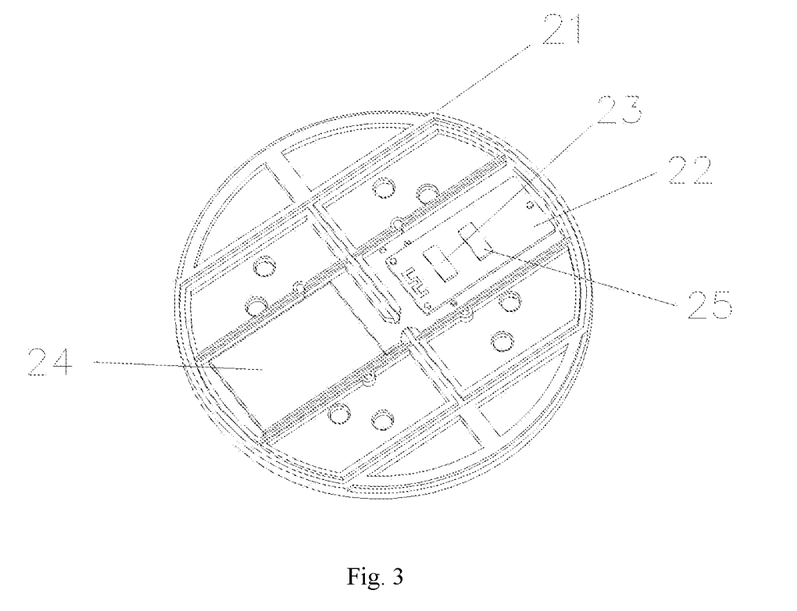
FIG. 3 is a schematic diagram showing a partial structure of the control unit according to one embodiment of the present disclosure.
Figure 4:
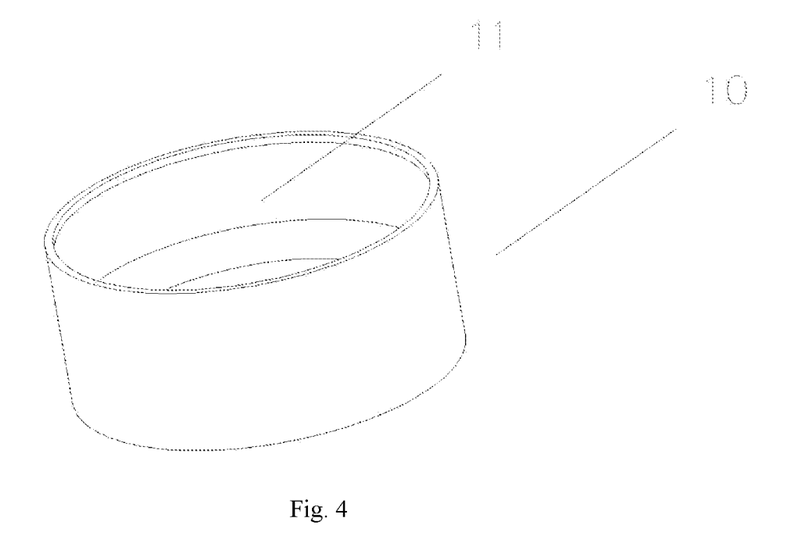
FIG. 4 is a schematic diagram showing the structure of a main body of the smart bottle holder according to another embodiment of the present disclosure.
Figure 5:
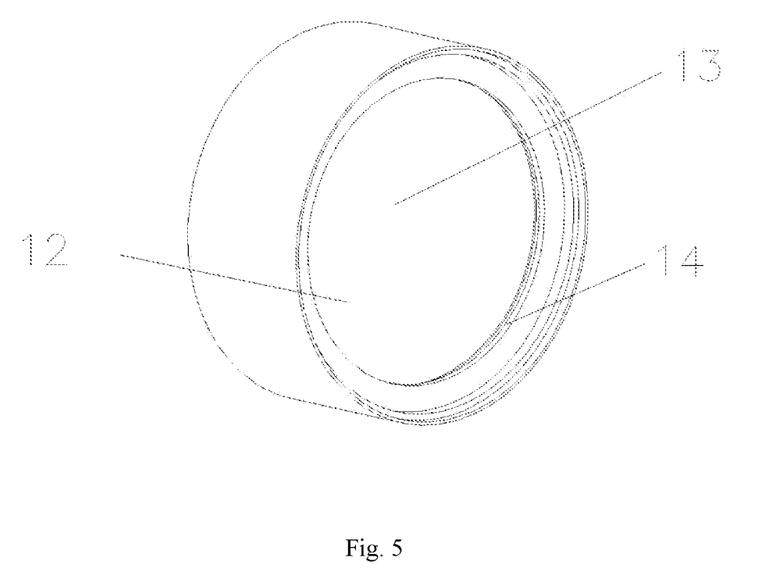
FIG. 5 is a schematic diagram showing the structure of a main body of the smart bottle holder according to another embodiment of the present disclosure.
Figure 6:
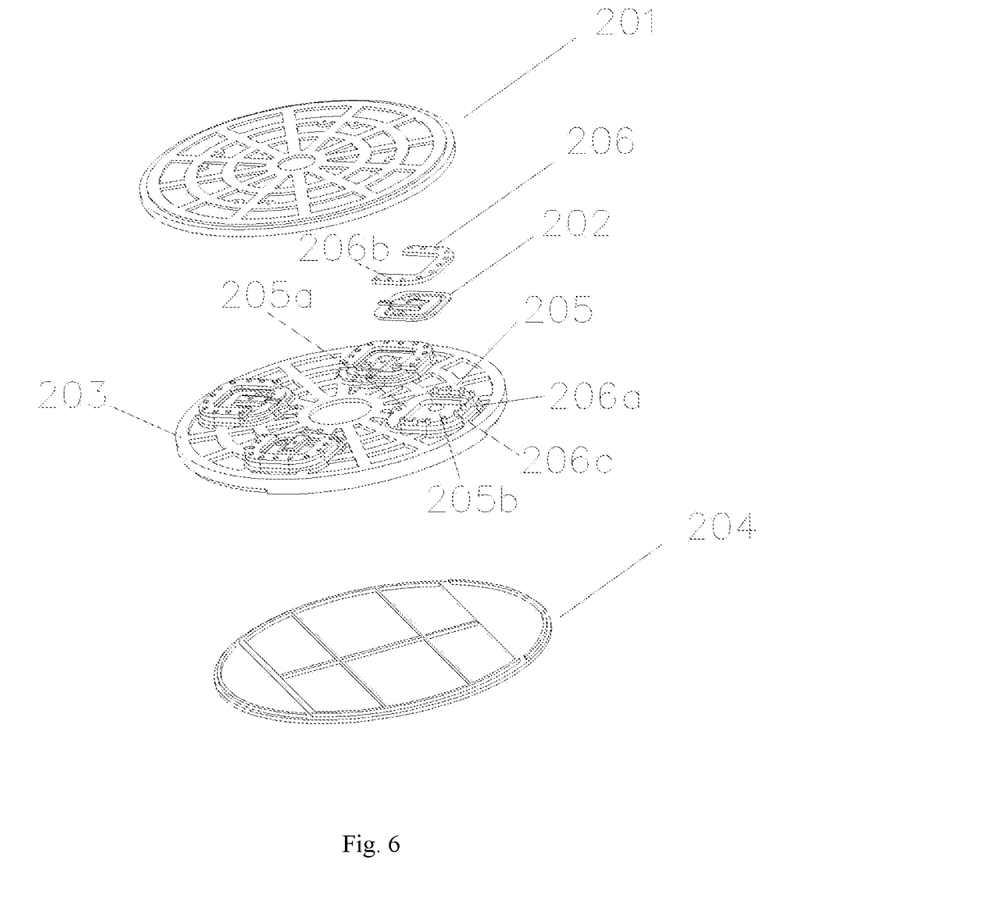
FIG. 6 is an exploded view showing the structure of the control unit according to one embodiment of the present disclosure.
Figure 7:
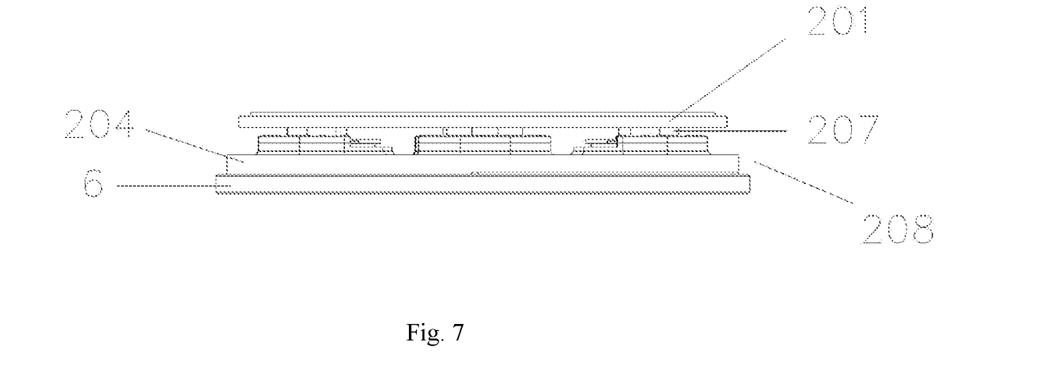
FIG. 7 is a schematic diagram showing the assembled state of the control unit according to another embodiment of the present disclosure.

As shown in FIG. 6, the control unit 20 includes successively arranged upper cover 201, weighing sensors 202, middle plate 203, and bottom cover 204. An engagement protrusion is provided on the edge of the upper surface of the bottom cover 204. A groove for engaging with the engagement protrusion is provided on the edge of the lower surface of the middle plate 203. Further, the upper surface of the middle plate 203 is provided with sensor mounting regions 205 for placing the weighing sensors 202 in a one-to-one correspondence. The sensor mounting regions 205 and the weighing sensors 202 are the same in number. Sensor pressing members 206 are further provided to press and reinforce the sensors from the edges. Pressing protrusions 207 are provided on the lower surface of upper cover 201 at the positions corresponding to the weighing sensors 202 to press the corresponding weighing sensors 202. Further, as shown in FIGS. 3 and 5, the upper cover 201, the middle plate 203, and the lower cover 204 have increasing diameters to form a first step 208 on the edge of the weighing module 2. A second step 14 for matching and engaging with the first step 208 is provided on the edge of the partition 13 in the second cavity 12. Further, as shown in FIG. 4, the weighing module 21, controller 22, communication module 23, power module 24, and wake-up module 25 are embedded in corresponding mounting regions on the lower surface of the middle plate 203. The above-mentioned configuration jointly achieves a compact structure while improving the fall-off and hitting resistance, reducing the overall volume, thereby improving the overall performance of the structure. In practice, a structure of the weighing module with the above configuration can have an overall thickness of 15 mm or less, which is very simple and lightweight.

As shown in FIG. 6, according to an embodiment of the present disclosure, the sensor mounting region 205 includes a recess frame 205a and a recess 205b formed by the recess frame 205a. The sensor pressing member seat 206a is provided on the outer edge of the upper surface of the recess frame 205a. The weighing sensor is arranged on the inner edge of the upper surface of the recess frame 205a, and the upper surface of the weighing sensor 202 is aligned with the upper surface of the sensor pressing member seat 206a. The sensor pressing member 206 is arranged on and presses the weighing sensor 202 as being engaged with the protrusions 206c on the sensor pressing member seat 206a through the holes thereon by insertion. The bottom of the recess 205b is provided with through holes for wires to pass through, and there is a space between the bottom surface of the recess 205b and the lower surface of the weighing sensor 202 for accommodating wires. Since the weighing sensor 202 is embedded on the inner edge of the upper surface of the recess frame 205a, the upper surface of the weighing sensor 202 is aligned with the upper surface of the sensor pressing member seat 206a, and the sensor 202 is pressed by the sensor pressing member 206, the displacement of the sensors caused by shaking of the bottle can be avoided, and result errors caused by the displacement of the sensors can also be avoided, thereby improving the stability and reliability of the structure. The weighing module 21 may include four weighing sensors 202 evenly arranged on the upper surface of the middle plate 203. Specifically, the weighing sensors 202 may be evenly arranged on the middle plate 203 at the front, rear, left, and right side as shown in the drawing. The even arrangement of the weighing sensors 202 on the upper surface of the middle plate 203 can solve the problem of an unbalanced load of the sensors caused by a single point of force when only one sensor is provided, and reduce the overall volume of the weighing module 21.

Figure 8:
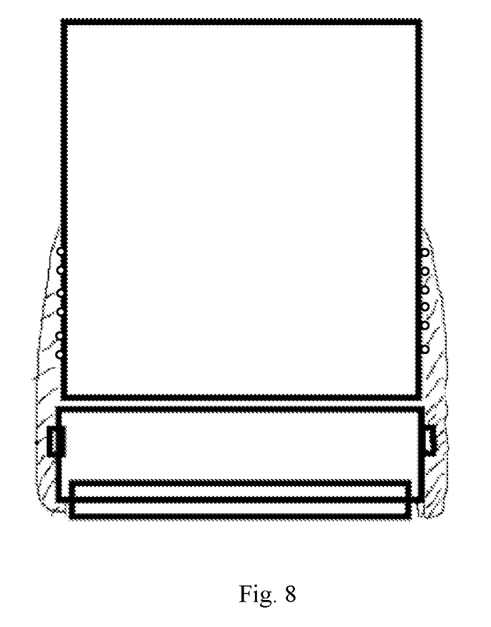
FIG. 8 is a schematic diagram showing the assembled state of the smart bottle holder and a bottle according to yet another embodiment of the present disclosure.

As shown in FIG. 8, according to one embodiment of the present disclosure, the outer edge of the upper cover 201, the middle plate 203, and/or the lower cover 204 of the control unit 20 is provided with an engagement protrusion for engaging with the inner wall of the second cavity 12. Further, the inner wall of the first cavity 11 and/or the second cavity 12 is provided with anti-slide particles, anti-slide strips, or anti-slide patterns to make the connection between the smart bottle holder and the bottle firmer. The first cavity 11 and the second cavity 12 may be integrally formed, thereby preventing water from leaking into the electrical modules from joint lines. The first cavity 11 is made of an elastic material and is connected to the bottle body by an interference fit. Namely, the size of the first cavity 11 is slightly smaller than or right equal to the size of the bottle to ensure that the bottle is firmly connected with the smart bottle holder. The second cavity 12 may be made of the same or different material of the first cavity 11. The first cavity 11 may be made of a silicone material, and the second cavity 12 may be made of silicone material or other materials, such as plastic and the like. The lower cover 30 may be a silicone pad with an anti-slide design on the bottom side, the weighing sensor 202 may be a pressure sensor or other sensors that can obtain the weight of the bottle and water therein, and the wake-up module 25 includes at least one multi-axis accelerometer to wake up the system under set conditions and start working. The controller 22 obtains the outputs of the multi-axis accelerometer at a first frequency according to the wake-up signal, creates a curve within a period of time, analyzes the parameters of the curve, and recognizes the water drinking action. The parameters of the curve include the shape of the curve, the slope of key points of the curve. This embodiment may also include other technical means described in Embodiment 1 under suitable conditions, which will not be repeated herein.

Embodiment 3

According to another aspect, as shown in FIG. 11, the present disclosure provides a daily water consumption monitoring method, including:

S0. setting an initial state of the bottle holder main body as a sleep mode;

S1. detecting a movement signal of the bottle holder main body;

S2. issuing a wake-up signal to wake up the system when the movement signal is detected;

S3. acquiring movement data of the bottle holder main body;

S4. determining whether the bottle holder main body is put down and stands still according to the movement data, if yes, starting a timer, otherwise, returning to S3;

S5. controlling the weighing module to weigh the bottle and water therein to obtain and record a current weight as $w_t$ in response to the starting of the timer;

S6. determining whether a user performs a water drinking action according to the movement data, if yes, calculating a difference between a previous weight $w_{t-1}$ and a current weight $w_t$ as a water consumption, then replacing a value of $w_{t-1}$ with a value of $w_t$, otherwise, replacing the value of $w_{t-1}$ with the value of $w_t$ directly;

S7. determining whether the standstill time of the bottle holder main body is greater than or equal to the threshold, if yes, returning to S0, otherwise, returning to S5, and executing steps S5-S7 cyclically.

Specifically, in step S7, when the standstill time of the bottle holder main body does not exceed the threshold, returns to step S5 and records the current weight of the bottle and water obtained in real time as $w_t$, and executes steps S5-S7 cyclically.

Further, the method includes sending the statistics of the water consumption data to the external device, and the external device may be various mobile smart terminals.

Further, the method includes acquiring the multi-axis accelerations of the bottle holder main body at a fixed frequency according to the wake-up signal, creating a curve of the multi-axis accelerations within a period of time, and recognizing the water drinking action by analyzing the parameters of the curve. The parameters of the curve include the shape of the curve and the slope of the key points of the curve.

The specific method for water consumption statistics is similar to that of Embodiment 1, and will not be repeated herein.

Embodiment 4

Figure 9:
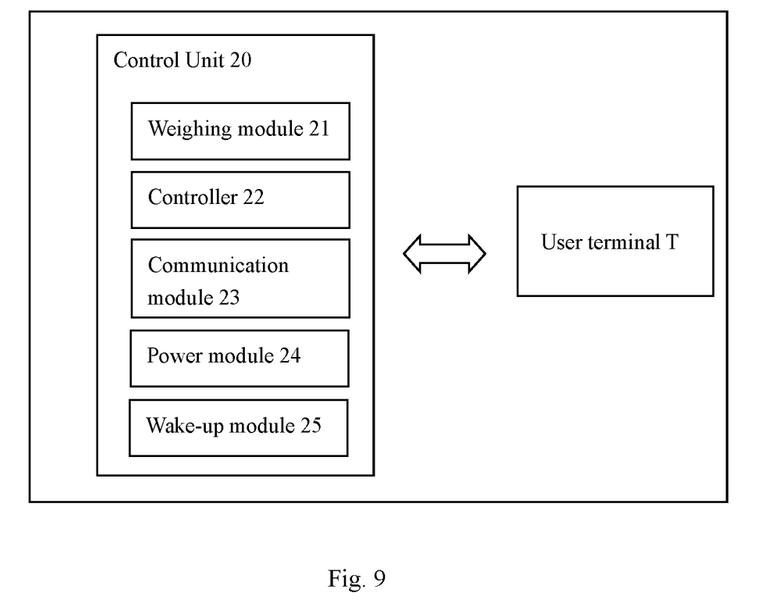
FIG. 9 is a block diagram showing the structure of a water consumption monitoring system of the present disclosure.
Figure 10:
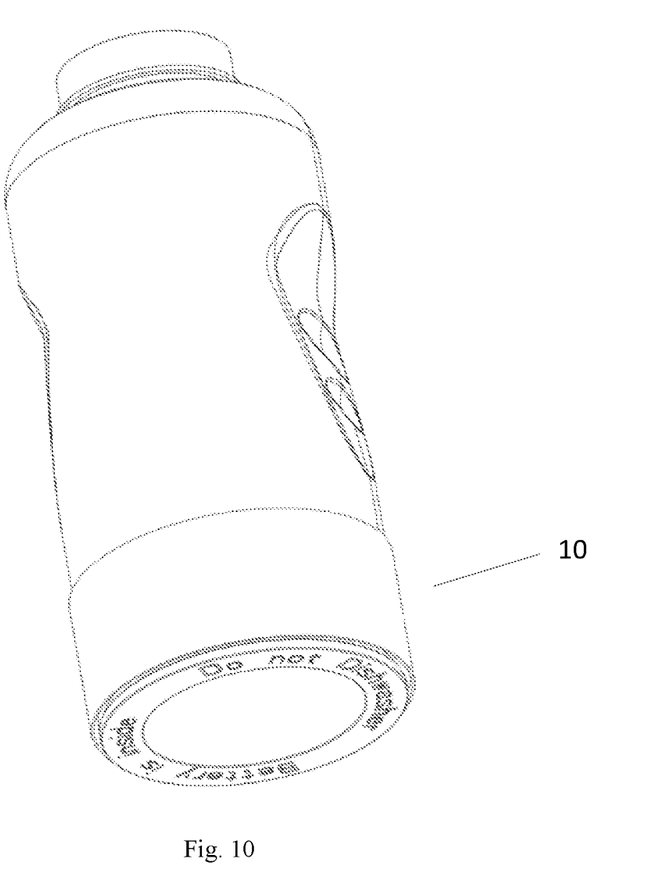
FIG. 10 is a schematic diagram showing a physical structure of the water consumption monitoring system of the present disclosure.

As shown in FIGS. 9-10, according to another aspect, the present disclosure provides a daily water consumption monitoring system, including: a smart bottle holder and a user terminal T. The smart bottle holder includes: a bottle holder main body 10 for accommodating a bottle, and a control unit 20 provided in a bottom part of the bottle holder main body 10. The control unit includes: a weighing module 21, for obtaining a total weight of the bottle and water therein; a controller 22, for determining whether a user performs a water drinking action according to movement data, wherein if the user performs the water drinking action, after the bottle is put down and stands still, the controller controls the weighing module to weigh the bottle and water to obtain a current weight, and calculate a difference between a previous weight and the current weight as a water consumption, otherwise, the controller controls the weighing module to weigh the bottle and water to obtain and save the current weight after the bottle is put down and stands still; a communication module 23, for sending water consumption data to an external terminal; and a power module, for supplying power to the weighing module, controller, and communication module. The user terminal T is used to update a daily water consumption, and is further used to remind the user to drink water in time when the water consumption is insufficient. The daily water consumption monitoring system of this embodiment, where appropriate, may further include other technical means described in the foregoing embodiments, which will not be repeated herein.

The implementations in the above-mentioned embodiments can be further combined or replaced with each other, and the described embodiments are only the alternate embodiments of the present disclosure, which do not limit the concept and scope of the present disclosure. Without departing from the design concept of the present disclosure, the various changes and improvements made to the technical solution of the present disclosure by those of ordinary skill in art fall within the scope of the present disclosure.

What is claimed is:

1. A smart bottle holder, comprising: a bottle holder main body for accommodating a bottle and a control unit provided in a bottom part of the bottle holder main body, wherein the control unit comprises:
a weighing module configured to obtain a total weight of the bottle and water in the bottle;
a controller configured to determine whether a user performs a water drinking action according to movement data of the bottle/bottle holder main body, wherein if the user performs the water drinking action, after the bottle is put down and stands still, the controller controls the weighing module to weigh the bottle and water to obtain a current weight, and calculates a difference between a previous weight and the current weight as a water consumption, if there is no water drinking action, the controller repeats a step of weighing the bottle and water to obtain and save the current weight after the bottle is put down and stands still until a standstill time of the bottle holder main body is greater than or equal to a threshold for entering a sleep mode;
a wake-up module for detecting a movement signal of the bottle holder main body and issuing a wake-up signal when the movement signal is detected, wherein the controller acquires the movement data from the wake-up module at a frequency of 10-60 times/sec according to the wake-up signal; and
a power module configured to supply power to the weighing module, controller, and communication module.

2. The smart bottle holder according to claim 1, wherein determine whether the bottle holder main body is put down and stands still, if yes, a timer is started; and
the controller is further configured to determine whether the standstill time of the bottle holder main body is greater than or equal to the threshold, if yes, entering the sleep mode.

3. The smart bottle holder according to claim 2, wherein the wake-up module is a multi-axis accelerometer, and the multi-axis accelerometer is configured to obtain the movement signal of the bottle holder main body.

4. The smart bottle holder according to claim 3, wherein the controller is further configured to obtain outputs of the multi-axis accelerometer at the frequency of 10-60 times/sec according to the wake-up signal, create a curve of the outputs within a period of time, analyze parameters of the curve, and recognize the water drinking action, wherein the parameters of the curve comprises a shape of the curve and slopes of key points of the curve.

5. The smart bottle holder according to claim 1, wherein the bottle holder main body comprises a first cavity and a second cavity that are separated from each other, a bottom of the bottle is detachably connected to the first cavity, and the control unit is arranged in the second cavity.

6. The smart bottle holder according to claim 5, wherein the weighing module comprises a plurality of weighing sensors, and the plurality of weighing sensors are evenly arranged around the bottom of the bottle.

7. A daily water consumption monitoring method, comprising:
- detecting a movement signal of a bottle holder main body;
- issuing a wake-up signal when the movement signal is detected;
- acquiring movement data of the bottle holder main body at a frequency of 10-60 times/sec according to the wake-up signal, determining whether the bottle holder main body is put down and stands still, if yes, starting a timer and controlling a weighing module to weigh a bottle and water therein to obtain and record a current weight as $w_t$, otherwise, continuing to acquire the movement data of the bottle holder main body;
- determining whether a user performs a water drinking action according to the movement data, if yes, calculating a difference between a previous weight $w_{t-1}$ and the current weight $w_t$ as a water consumption and replacing a value of $w_{t-1}$ with a value of $w_t$, otherwise, replacing the value of $w_{t-1}$ with the value of $w_t$ directly;
- determining whether a standstill time of the bottle holder main body is greater than or equal to a threshold, if yes, entering a sleep mode, otherwise, repeating the steps of weighing the bottle and water therein to obtain and record the current weight as $w_t$, determining whether the user performs the water drinking action according to the movement data, if yes, calculating the difference between the previous weight $w_{t-1}$ and the current weight $w_t$ as a water consumption and replacing the value of $w_{t-1}$ with the value of $w_t$, if there is no water drinking action, replacing the value of $w_{t-1}$ with the value of $w_t$ directly, until the standstill time of the bottle holder main body is greater than or equal to the threshold.

8. A daily water consumption monitoring system, comprising:
- a smart bottle holder and a user terminal;
- wherein, the smart bottle holder further comprises: a bottle holder main body for accommodating a bottle, and a control unit provided in a bottom part of the bottle holder main body, wherein the control unit further comprises:
  - a weighing module configured to obtain a total weight of the bottle and water therein;
  - a controller configured to determine whether a user performs a water drinking action according to movement data of the bottle/bottle holder main body, wherein if the user performs the water drinking action, after the bottle is put down and stands still, the controller controls the weighing module to weigh the bottle and water to obtain a current weight, and calculate a difference between a previous weight and the current weight as a water consumption, if there is no water drinking action, the controller repeats a step of weighing the bottle and water to obtain and save the current weight after the bottle is put down and stands still until a standstill time of the bottle holder main body is greater than or equal to a threshold for entering a sleep mode;
  - a wake-up module for detecting a movement signal of the bottle holder main body and issuing a wake-up signal when the movement signal is detected, wherein the controller acquires the movement data from the wake-up module at a frequency of 10-60 times/sec according to the wake-up signal;
  - a communication module configured to send water consumption data to an external terminal;
  - a power module configured to supply power to the weighing module, controller, and communication module; and
- the user terminal is configured to update a daily water consumption, and is further used to remind the user to drink water in time when the water consumption is insufficient.

9. The daily water consumption monitoring system according to claim 8, wherein
- determine whether the bottle holder main body is put down and stands still, if yes, a timer is started; and
- the controller is further used for determining whether the standstill time of the bottle holder main body is greater than or equal to the threshold, if yes, entering a sleep mode.

* * * * *